July 11, 1939.  E. H. LAND  2,165,974
DISPLAY DEVICE EMPLOYING POLARIZED LIGHT
Filed May 20, 1938
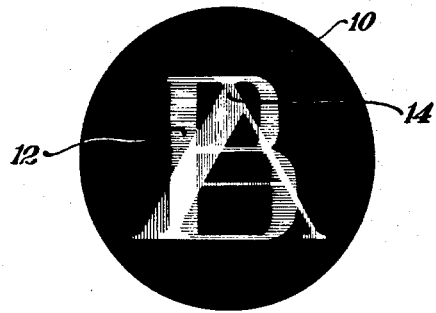
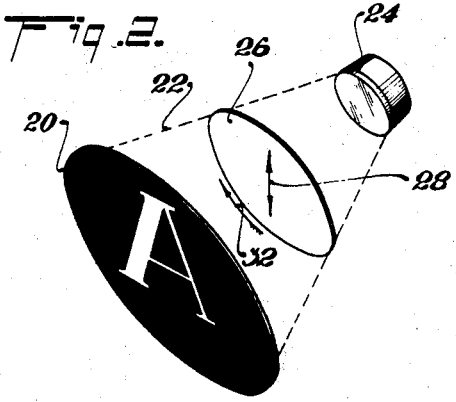
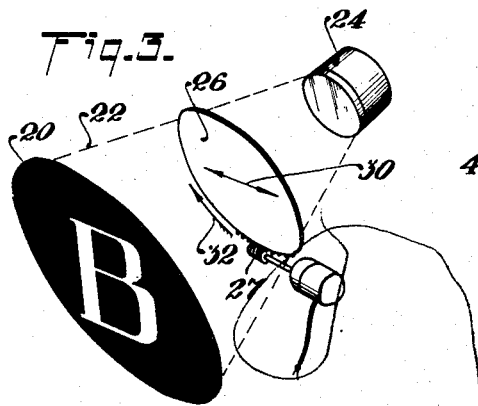
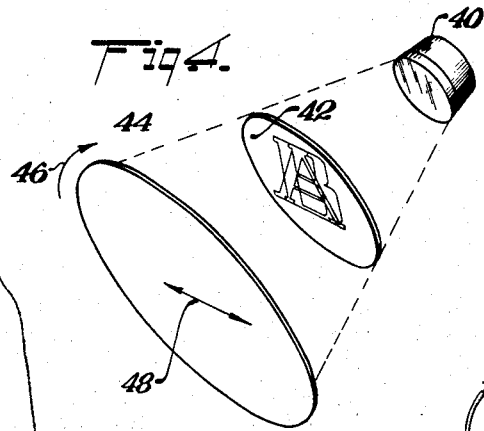
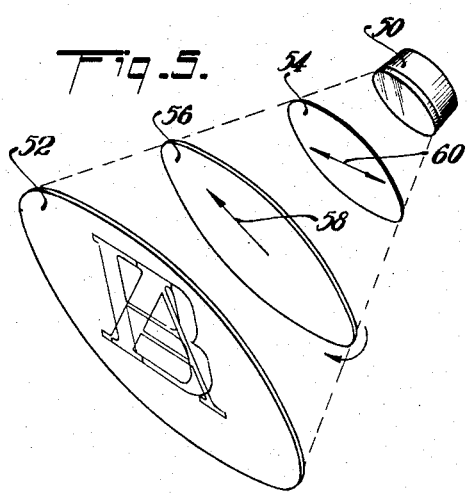
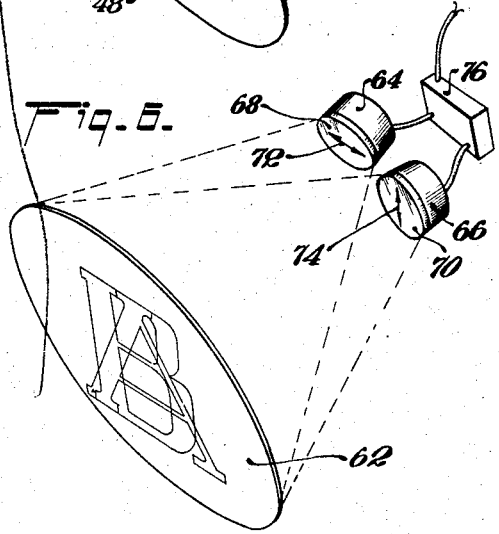
INVENTOR.
Edwin H. Land
BY
Brown & Jones
ATTORNEYS Patented July 11, 1939

2,165,974

UNITED STATES PATENT OFFICE 2,165,974

DISPLAY DEVICE EMPLOYING POLARIZED LIGHT

Edwin H. Land, Wellesley Farms, Mass., assignor, by mesne assignments, to Polaroid Corporation, Dover, Del., a corporation of Delaware Application May 20, 1938, Serial No. 209,061

9 Claims. (Cl. 40—130)

This invention relates to new and improved display devices employing polarized light.

An object of the invention is to provide a device of the character described comprising a plurality of superimposed designs, each formed in a light-polarizing surface, and means associated with a light source or sources illuminating said superimposed plurality of designs for rendering either of said designs substantially invisible while the other of said designs is rendered visible to an observer.

Other objects of the invention are to provide a device of the character described in which rotatable means, comprising a light-polarizing element or a wave-retardation device may be positioned between a light source and the superimposed plurality of designs; to provide a plurality of light sources for illuminating said superimposed plurality of designs with means associated with said sources for differently polarizing light emanating from one source with respect to the light emanating from the other source, and means for periodically extinguishing either or both of said light sources.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a diagrammatic view in front elevation of a plurality of superimposed designs formed in light-polarizing surfaces and comprising one element of the combination of the present invention;

Fig. 2 is a diagrammatic view in perspective of the elements of the combination of the present invention so positioned that one of the superimposed designs of the device shown in Fig. 1 is visible to an observer;

Fig. 3 is a similar view of the same elements so positioned that the other of said designs is visible to an observer;

Fig. 4 is a similar view of a modified form of the invention;

Fig. 5 is a similar view of a still further modification of the invention; and

Fig. 6 is a similar view of a modification of the invention employing two separate light sources.

This invention contemplates the provision of apparatus for advertising displays and the like, and for other novel and useful purposes, such for example as the fade-out and fade-in effect of superimposed images in picture projection and the like, which comprises means to provide a plurality of superimposed distinct designs, images, pictures or other indicia in light-polarizing media with means associated therewith and in the path of light incident thereon for so controlling the character of polarization of said light as to render one only of said superimposed plurality of images or designs visible to an observer.

The invention also contemplates the provision of means whereby the image which is rendered visible to an observer may be caused to gradually fade from view while the other image which at first may be invisible to an observer gradually comes into view, until it at last is clearly visible, while the first image has disappeared.

The invention also contemplates the provision of means associated with the light source illuminating the superimposed images such that either image may be rendered visible and then instantaneously invisible while the other image is rendered visible to an observer.

In Fig. 1 there is shown somewhat diagrammatically an element of the novel combination of the present invention. This comprises a support 10 on which there may be means to provide a plurality of superimposed light-polarizing surfaces, the polarizing axis of one surface being substantially at right angles to the polarizing axis of the other surface. A design may be formed in each surface, and these designs preferably differ. In the device shown in the drawing the designs are represented by the letters A and B. The designs may be of any form. They may be pictures, numbers, full-tone prints, half-tone prints, line drawings, etc. Each design may be formed in a polarizing surface by treating the surface over predetermined areas thereof so as to destroy or impair to varying degrees the polarizing properties of the surface, or in the production of the polarizing surface the formation of the polarizing area and the properties thereof may be controlled, as by inhibiting the formation of polarizing crystals over the predetermined portions of the area to give the desired design.

The polarizing areas themselves may comprise a polarizing film, such for example as the material sold under the trade name "Polaroid", or any other means for providing polarizing surfaces. These surfaces may, for example, comprise deposited crystals of light-polarizing material and may be formed in a manner well-known to the art. The designs in the surfaces may be formed by physically removing portions of the polarizing areas or by treating the areas with pastes or solutions of an ink-like consistency which are adapted to destroy the polarizing properties of the areas. In this connection reference should be had to my copending application Serial No. 209,060, filed May 20, 1938, wherein various methods are described for the formation of designs in light-polarizing media.

It is to be understood that the two light-polarizing surfaces may be on the same side or on opposite sides of the support, which may be of glass or of a transparent film, such for example as the type of film employed in motion picture projection and in photography, or the support may be of any other light-transmitting material. Under certain circumstances, where the superimposed designs are to be viewed from the direction in which the light is incident thereon, the support need not be transparent, but may be opaque. In this case both light-polarizing surfaces should be on the same side or face of the support.

In the device shown in Fig. 1, the polarizing axis of one surface is shown by the horizontal shade lines 12 to be at right angles to the polarizing axis of the other surface, which is shown by the vertical shade lines 14, it being understood that the direction of the shade lines is to be taken as corresponding to the direction of the polarizing axis. Where the two polarizing surfaces overlie, no light is transmitted and the field appears dark, as shown in Fig. 1. The remainder of the field, i. e., the portions of the designs which overlie each other and the portions of the designs which overlie polarizing areas of the adjacent polarizing surface, but which are themselves non-polarizing, appears substantially clear when the device is viewed in ordinary light. These areas would comprise the portions of the designs shown in Fig. 1 in lightly shaded horizontal and vertical lines and those portions of the designs shown as clear, unshaded areas.

The design represented by the letter A, for example, is shown as formed in the light-polarizing surface having its plane of polarization substantially horizontal. As a result, so much of the design A as does not overlie the design B overlies a light-polarizing surface which has a vertical polarizing axis, and these portions of the design A are hence shown with the vertical shading 14. So also the design shown as B is formed in the surface which has its polarizing axis vertical, and hence those portions of the design which do not overlie the design A overlie polarizing areas which have horizontal light-polarizing axes, as indicated at 12.

If the device shown in Fig. 1 is positioned as shown in Fig. 2 at 20 in the path of light beams 22 emanating from a source 24, and if that source is polarized, as for example by causing the beams to traverse a light-polarizing element 26, then the visibility of either or both of the designs A and B will depend upon the direction of vibration of the beam 22 after it traverses the element 26.

As shown in Fig. 2, the element 26 is positioned with its axis indicated by the arrow 28 substantially parallel to the polarizing axis of the surface in which the design B is formed, i. e., the element 26 is positioned with its polarizing axis substantially vertical. Under these circumstances the design B becomes invisible to an observer of the element 20 and the design A alone is visible. This is true whether the observer is positioned on the same side of the element 20 as the light source 24 or whether the element 20 is between the observer and the light source. If the element 26 is rotated, for example by the motor-driving worm 27 meshing with a gear around the surface of the element 26, so that its axis is as shown in Fig. 3 by the arrow 30 substantially horizontal, then the design A disappears and the design B, which is formed in the surface which has its polarizing axis vertical, becomes visible.

Preferably in the combination of the present invention the polarizing element 26 is mounted for rotation with respect to the element 20, and this is indicated by the arrow 32. It will be apparent that as the element 26 is being rotated from the position shown in Fig. 2 to the position shown in Fig. 3, there is a gradual transition between the position at which the design A is visible and the position at which the design B is alone visible, and during this transitional period more or less of each design will be apparent to an observer, so that the effect of a gradual fading in of one design and fading out of the other may be obtained.

It is furthermore to be understood that the element 26 may be positioned between an observer and the element carrying the superimposed designs. Such an arrangement is shown diagrammatically in Fig. 4, where 40 indicates the light source, 42 the element bearing the superimposed designs in light-polarizing surfaces, and 44 indicates an element which is the full equivalent of the element 26, i. e., a light-polarizing area, which may preferably be mounted for rotation, as indicated by the arrow 46. 48 may be taken as indicating direction of vibration of light transmitted by the element 44. As shown in Fig. 4, an observer positioned so that the element 44 and the element 42 are between him and the light source, and looking through the element 44, will see only the design B. With rotation of the element 44 both designs become visible, and when the element has been rotated 90°, the design B will disappear and the design A will become visible. It is of course to be understood that the relative positions of the elements which have been described need not be as shown in the drawings. The light-polarizing area indicated as at 26 and at 44 may be closely adjacent the element carrying the superimposed designs, as indicated at 20 and 44, or it may be spaced widely therefrom. All the elements may form a compact assemblage, or they may be spaced substantial distances from each other. It is further to be understood that combinations such as have been described may be employed with suitable projecting apparatus, and the images may be cast upon a viewing screen. Other modified devices embodying the principle of the invention heretofore described will be immediately apparent to a person skilled in the art.

A modified form of the invention is shown in Fig. 5. Here the light source is indicated as at 50, the support carrying the superimposed designs is indicated as at 52, and the light-polarizing element adapted to polarize light emanating from the source is indicated as at 54. In this modification of the invention all of these elements may be fixedly mounted with respect to each other, and rotation of the plane of polarization of the transmitted beam may be secured by the provision of a rotatably mounted half-wave device 56. This device may take the form of a half-wave sheet of birefringent material, such for example as half-wave Cellophane, or it may be any half-wave device known to the art. If the arrow 58 is taken as indicative of the direction of the principal optic axis of this element and the arrow 60 indicates the direction of the polarizing axis of the element 54, it will be apparent that in the form shown in Fig. 5, where the arrow 60 is shown as substantially horizontal and the arrow 58 as at approximately 45° to the horizontal, the design A will be visible, for the half-wave element 56 will cause a 90° rotation in the plane of polarization of the transmitted beam. If then the element 56 is rotated so that its principal optic axis is substantially parallel with the axis 60 of the element 54, the design B will become visible.

While in the devices heretofore described the design carrying element has been described as fixedly positioned, it is to be understood that it may, if desired, be rotatably mounted, and the visibility or invisibility of the designs thereon controlled by rotation thereof, while the polarizing element associated with the light source may remain fixedly in position.

A still further modification of the invention is shown in Fig. 6. Here the element carrying the two superimposed designs is indicated as at 62. In this form of the invention a plurality of light sources 64, 66 are provided, each equipped with a light-polarizer 68 and 70. The polarizer 68 associated with the light source 64 may have its polarizing axis substantially horizontal, as indicated by the arrow 72, i. e., so positioned that when the light source 64 is illuminating the element 62 and the light source 66 is dark, the design B will be visible. The polarizer 70 associated with the light source 66 may be so positioned that its polarizing axis, as indicated by the arrow 74, is substantially vertical, so that when this light source is illuminating the element 62 and the light source 64 is dark, the design A will be visible.

Flasher switch means shown generally as at 76 may be provided in circuit with the light sources 64, 66 adapted to cause one only of these sources to illuminate the element 62 at any one time, and adapted to cause periodic change in the light source illuminating the element 62. With such a device it will be apparent that the image on the element 62 visible to an observer will change instantaneously and with predetermined periodicity from the image A to the image B, and vice versa.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a light source, means interposed in the path of beams emanating from said source for providing a plurality of superimposed light-polarizing surfaces, the polarizing axis of one surface being positioned at substantially right angles to the polarizing axis of the other surface, each surface forming a design comprising areas adapted to transmit to different degrees light predeterminedly polarized, additional light-polarizing means positioned in the path of said beams and between said source and an observer, and means for predeterminedly altering the vibration direction of light issuing from said source and traversing said additional light-polarizing means and said surfaces.

2. In combination, a light source, means interposed in the path of beams emanating from said source for providing a plurality of superimposed light-polarizing surfaces, the polarizing axis of one surface being positioned at substantially right angles to the polarizing axis of the other surface, each surface forming a design comprising areas adapted to transmit to different degrees light predeterminedly polarized, additional light-polarizing means positioned in the path of said beams and between said source and said superimposed surfaces, and means for predeterminedly altering the vibration direction of light issuing from said source and traversing said additional light polarizing means and said surfaces.

3. In combination, a light source, means interposed in the path of beams emanating from said source for providing a plurality of superimposed light-polarizing surfaces, the polarizing axis of one surface being positioned at substantially right angles to the polarizing axis of the other surface, each surface forming a design comprising areas adapted to transmit to different degrees light predeterminedly polarized, additional light-polarizing means positioned in the path of said beams and between said source and said superimposed surfaces, and means for rotating said additional light-polarizing means whereby the vibration direction of light from said source incident on said surfaces may be made to coincide substantially with the polarizing axis of either surface.

4. In combination, means providing a pair of superimposed light-polarizing surfaces having their polarizing axes crossed, each surface providing a design when viewed in polarized light, means to illuminate said surfaces, means interposed between said illuminating means and an observer, and intercepting light emanating from said illuminating means and incident on said surfaces, for polarizing said light, and means for altering the vibration direction of light incident on said surfaces before it reaches an observer to render substantially invisible either of said designs.

5. In combination, means providing a pair of superimposed light-polarizing surfaces having their polarizing axes crossed, each surface providing a design when viewed in polarized light, measn to illuminate said surfaces comprising a plurality of spaced light sources, light-polarizing means positioned adjacent each source to polarize light emanating therefrom and incident on said surfaces, the polarizing axes of said polarizing means being substantially at right angles to each other, and means associated with said sources for causing each source alternately to illuminate said surfaces.

6. In combination, means providing a pair of superimposed light-polarizing surfaces having their polarizing axes crossed, each surface providing a design when viewed in polarized light, means to illuminate said surfaces, means interposed between said illuminating means and an observer, and intercepting light emanating from said illuminating means and incident on said surfaces, for polarizing said light, and means for moving said polarizing means from a position with its polarizing axis parallel to the polarizing axis of one of said surfaces to a position with its polarizing axis at right angles thereto.

7. In combination, means providing a pair of superimposed light-polarizing surfaces having their polarizing axes crossed, each surface providing a design when viewed in polarized light, means to illuminate said surfaces, means interposed between said illuminating means and an observer, and intercepting light emanating from said illuminating means and incident on said surfaces, for polarizing said light, and means for altering the direction of vibration of light traversing said polarizing means before said light is incident on said surfaces from a vibration direction parallel with the polarizing axis of one of said surfaces to a direction at right angles thereto.

8. A display device comprising a light source, a rotatable light-polarizer and means providing a plurality of superimposed light-polarizing surfaces, each surface comprising areas differently polarizing a transmitted beam of light, the polarizing axis of said surfaces being at right angles to one another, said surface-providing means and said polarizer being positioned to intercept the same beams emanating from said source, said polarizer being positioned between said source and said surfaces.

9. In combination, a light source, means providing three light-polarizing surfaces intercepting the same beams emanating from said source, each of two of said surfaces comprising areas adapted to differently polarize transmitted light whereby each said surface forms a design in polarized light, said two surfaces having their polarizing axes positioned substantially at right angles to one another, and means providing relative motion between said two surfaces and said third surface whereby the vibration direction of light transmitted by said third surface may coincide with the polarizing axis of either of said two surfaces, at least one of said two surfaces being positioned between said source and said third surface.

EDWIN H. LAND.